United States Patent
Sheth et al.

(10) Patent No.: US 12,160,910 B2
(45) Date of Patent: Dec. 3, 2024

(54) SYSTEM AND METHOD FOR SILENTLY PAIRING DEVICES

(71) Applicant: ZEBRA TECHNOLOGIES CORPORATION, Lincolnshire, IL (US)

(72) Inventors: Maulin Sheth, Central Islip, NY (US); Mariya Wright, Cortland Manor, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 357 days.

(21) Appl. No.: 17/589,152

(22) Filed: Jan. 31, 2022

(65) Prior Publication Data

US 2023/0276513 A1 Aug. 31, 2023

(51) Int. Cl.
*H04W 76/14* (2018.01)

(52) U.S. Cl.
CPC .................................. *H04W 76/14* (2018.02)

(58) Field of Classification Search
CPC ... H04W 76/14; H04W 12/084; H04W 12/47; H04W 12/50; H04W 4/80; H04L 61/00; H04L 2101/622

See application file for complete search history.

(56) References Cited

U.S. PATENT DOCUMENTS

| | | | |
|---|---|---|---|
| 9,680,822 B2 | 6/2017 | Soelberg et al. | |
| 10,187,362 B1* | 1/2019 | McClintock | H04L 63/0272 |
| 11,218,836 B1* | 1/2022 | Ilieva | H04W 4/021 |
| 11,605,078 B1* | 3/2023 | Adam | G06Q 20/322 |
| 2006/0072755 A1 | 4/2006 | Oskari | |
| 2008/0070501 A1 | 3/2008 | Wyld | |
| 2009/0222659 A1* | 9/2009 | Miyabayashi | H04L 9/3239 713/175 |
| 2010/0009629 A1 | 1/2010 | Jung et al. | |
| 2012/0317619 A1* | 12/2012 | Dattagupta | H04W 12/50 726/4 |
| 2014/0282923 A1* | 9/2014 | Narayan | H04W 12/50 726/5 |
| 2015/0215770 A1* | 7/2015 | Chan | H04W 8/14 455/456.1 |

(Continued)

OTHER PUBLICATIONS

GMC, How to Pair Your Bluetooth Device with GMC Intelllink,: GMC Life article, Oct. 17, 2021, retrieved on Apr. 27, 2023, Retrieved from <URL:www.gmc.com/gmc-life/how-to/connect-to-bluetooth> entire document.

(Continued)

*Primary Examiner* — Cindy Trandai

(57) ABSTRACT

A method of pairing a client device to a host device, the method comprising: obtaining, at the host device, a reference approval code; receiving, at the host device, a pairing request from the client device; when the pairing requests includes an embedded approval code, comparing the embedded approval code to the reference approval code; when the embedded approval code matches the reference approval code, bypassing an approval request and approving a pairing of the client device to the host device; and responsive to approving the pairing, pairing the client device to the host device based on the pairing request.

19 Claims, 9 Drawing Sheets

(56) References Cited

U.S. PATENT DOCUMENTS

| | | | |
|---|---|---|---|
| 2016/0198402 A1* | 7/2016 | Ko | H04W 12/06 |
| | | | 370/329 |
| 2016/0210106 A1 | 7/2016 | Hampapuram et al. | |
| 2018/0039934 A1* | 2/2018 | Mulaosmanovic | G06Q 10/08 |
| 2018/0184464 A1* | 6/2018 | Fang | H04L 67/12 |
| 2018/0276651 A1* | 9/2018 | Gauli | G06Q 20/08 |
| 2018/0316658 A1 | 11/2018 | Bartlett et al. | |
| 2020/0110870 A1* | 4/2020 | Girdhar | G06F 21/316 |
| 2020/0195424 A1* | 6/2020 | Bhella | G06K 7/1417 |
| 2020/0293166 A1* | 9/2020 | Timonen | G06F 3/1423 |
| 2020/0396517 A1* | 12/2020 | Hodge | H04N 21/4223 |
| 2022/0030403 A1* | 1/2022 | Peng | H04W 80/02 |
| 2022/0272536 A1* | 8/2022 | Anderson | H04W 12/61 |
| 2022/0361264 A1* | 11/2022 | Burns | H04B 17/318 |

OTHER PUBLICATIONS

International Search Report and Written Opinion for International Application No. PCT/US2023/011840 mailed on May 30, 2023.

* cited by examiner

SYSTEM AND METHOD FOR SILENTLY PAIRING DEVICES

BACKGROUND

A host device and a client device can pair to establish a wireless connection between the two devices, enabling them to easily communicate, pass information back and forth, and the like. To ensure that paired devices are paired intentionally, the process of pairing may include an approval request, requiring manual input from a user to confirm the pairing. In some facilities, such as in a transport and logistics facility, many different devices may be paired with a given host device, over the course of a day, or day to day, and the manual approval request process for certain types of devices which are often paired may be time-consuming and irritating.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
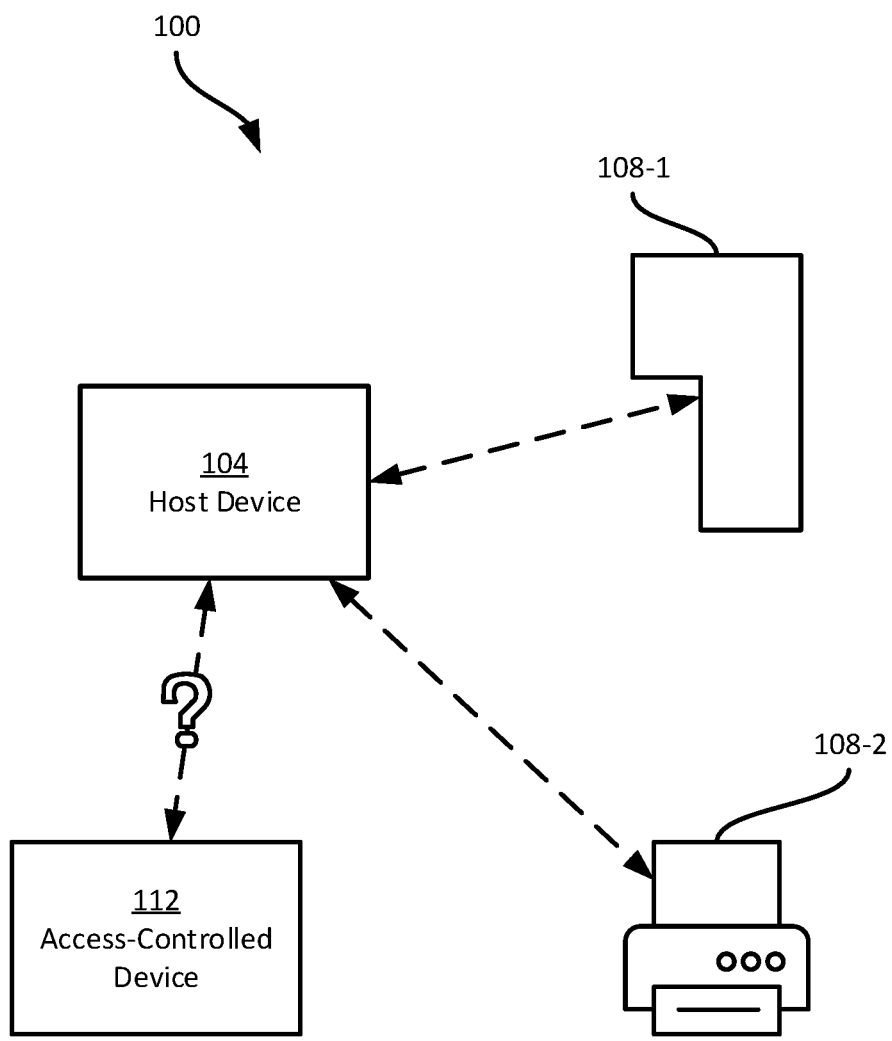
FIG. 1 is a schematic diagram of a system for silently pairing devices

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method comprising: obtaining, at the host device, a reference approval code; receiving, at the host device, a pairing request from the client device; when the pairing requests includes an embedded approval code, comparing the embedded approval code to the reference approval code; when the embedded approval code matches the reference approval code, bypassing an approval request and approving a pairing of the client device to the host device; and responsive to approving the pairing, pairing the client device to the host device based on the pairing request.

Additional examples disclosed herein are directed to a device comprising: a communications interface configured to pair to a client device; a memory; a processor interconnected with the memory and the communications interface, the processor configured to: obtain a reference approval code; receive a pairing request from the client device; when the pairing requests includes an embedded approval code, compare the embedded approval code to the reference approval code; when the embedded approval code matches the reference approval code, bypass an approval request and approve a pairing of the client device to the computing device; and responsive to approving the pairing, control the communications interface to pair the client device to the computing device based on the pairing request.

Additional examples disclosed herein are directed to a device comprising: a communications interface; a reader configured to read optical representations of data; a controller configured to: control the reader to scan an optical representation presented at a host device; extract, from the optical representation, pairing parameters for the host device and a reference approval code to enable silent pairing; control the communications interface to send a pairing request to the host device based on the pairing parameters, the pairing request including the reference approval code as an embedded approval code.

Additional examples disclosed herein are directed to a system comprising: a computing device comprising a communications interface and a controller; and a radio frequency identification (RFID) tag associated with the computing device, the RFID tag encoding pairing parameters for the computing device and an approval code for the computing device; and wherein the controller of the computing device is configured to: receive an incoming pairing request from a host device; extract host device pairing parameters from the incoming pairing request; and control the communications interface to send an outgoing pairing request to the host device based on the host device pairing parameters, the pairing request including the approval code for the computing device as an embedded approval code.

FIG. 1 depicts a system 100 for silently pairing devices in accordance with the teachings of this disclosure. The system 100 includes a host device 104 and one or more client devices which may pair (i.e., form a wireless connection) with the host device 104. In the present example, two privileged client devices 108-1 and 108-2 (referred to herein generically as a privileged client device 108 and collectively as privileged client devices 108, or simply as privileged device(s) 108) are depicted, and one access-controlled client device 112 is depicted.

The host device 104 may be a computing device such as a desktop computer, a laptop computer, a handheld computer, a tablet, a mobile phone, or the like. For example, the host device 104 may support a plurality of connections to client devices, and may act as a processing hub or the like for the client devices. The client devices 108 and 112 may be peripheral devices or other devices, such as barcode scanners, mobile printers, heads-up display (HUD) glasses, speakers, headphones, or the like. The client devices 108, 112 may have limited computing capabilities and may pair to the host device 104 to receive instructions, to exchange data for further processing, or the like.

For example, the system 100 may be deployed in a transport and logistics facility, such as a warehouse, a retail facility, or the like. For example, the client device 108-1 may be a barcode scanner used, for example, by a worker, to scan products, packages, or the like, while the host device 104 may be a handheld computer used by the worker. The pairing of the client device 108-1 with the host device 104 may therefore allow the client device 108-1 to communicate the items scanned to the host device 104 for tracking and further processing.

Typically, to enable a pairing between a client device, such as one of the devices 108 or 112, the host device 104 may present a pop-up or dialogue box for the worker to provide input to approve the pairing of the client device to the host device 104. Once such an approval is received, the host device 104 may continue with the pairing. That is, the pairing process is not silent (i.e., requests user input). Such a pairing process may be time consuming and cumbersome when pairing devices often. For example, in a warehouse facility, users may connect different barcode scanners to their mobile computers every day, or multiple times per day.

Accordingly, certain devices may have privileged access to streamline the pairing process. In particular, the privileged devices 108 use an approval code which can be verified by the host device 104 during the pairing process to facilitate identification of the privileged devices 108 as having privileged access and enable silent pairing, as will be described further herein. That is, the pairing request initiated by the privileged devices 108 may include a secure approval code embedded in the pairing request. If the embedded approval code matches a reference approval code known by the host device 104, the host device 104 may approve the pairing to the privileged devices 108 without requesting user input to complete the pairing. The privileged devices 108 therefore pair silently and automatically with the host device 104.

The access-controlled device 112 may be a client device which may pair with the host device 104 according to a regular pairing process, including requesting approval by a user of the host device 104 to complete the pairing. Such a pairing therefore is not silent.

Figure 2:
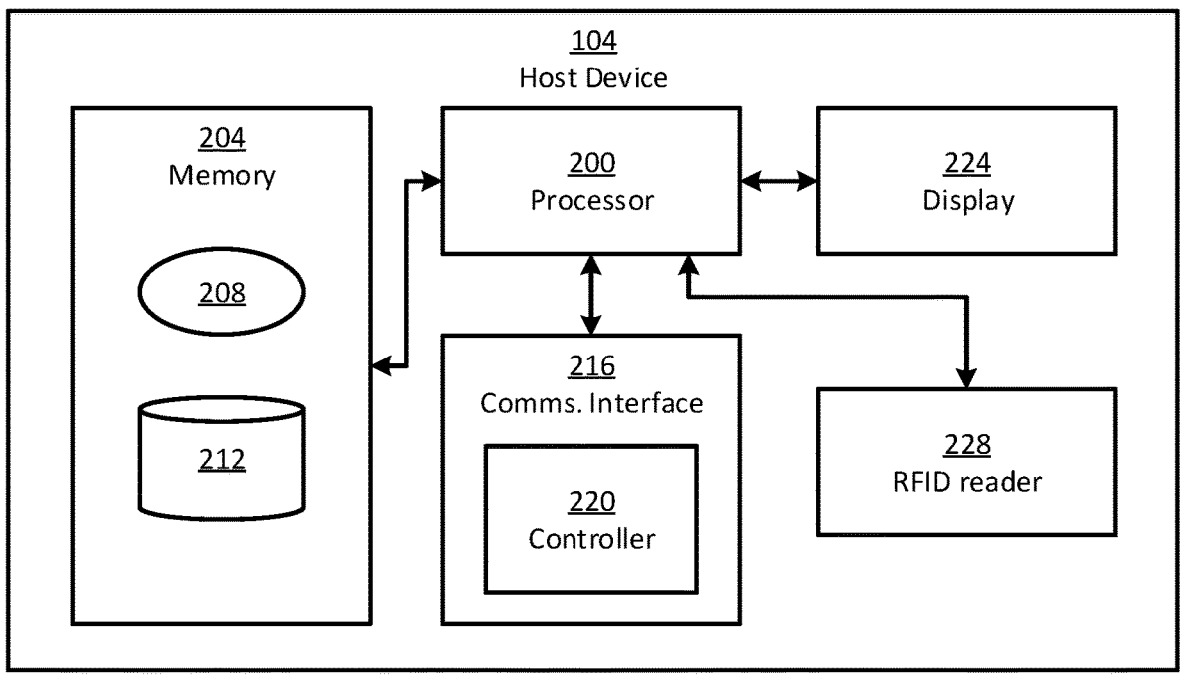
FIG. 2 is a block diagram of certain internal hardware components of the host device of FIG. 1.

Turning now to FIG. 2, certain internal components of the host device 104 are illustrated. The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits.

The memory 204 stores computer-readable instructions for execution by the processor 200. In particular, the memory 204 stores an application 208 which, when executed by the processor, configures the processor 200 to perform various functions discussed below in greater detail and related to the pairing operation of the device 104. The application 208 may also be implemented as a suite of distinct applications. The memory 204 also stores a repository 212 storing rules and data for the pairing operation.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the operations discussed herein.

The device 104 also includes a communications interface 216 enabling the device 104 to exchange data with other computing devices. The communications interface 216 is interconnected with the processor 200 and includes suitable hardware (e.g., transmitters, receivers, network interface controllers and the like) allowing the device 104 to communicate with other computing devices-such as the client devices 108, 112. The specific components of the communications interface 216 are selected based on the type of network or other links that the device 104 is to communicate over. For example, the communications interface 216 may enable Bluetooth or other short-range wireless communications protocols to allow the host device 104 to pair with the client devices 108, 112.

The communications interface 216 may additionally include a controller 220, such as a micro-controller, a micro-processor, or other suitable device capable of executing computer-readable instructions to control the components of the communications interface 216. The controller 220 may comprise one or more integrated circuits and may include and/or be interconnected with a non-transitory computer-readable storage medium storing computer-readable instructions which when executed configure the controller 220 and/or the communications interface 216 to perform the functionality described herein. For example, the controller 220 may comprise a Bluetooth stack.

The device 104 may further include one or more input and/or output devices, including a display 224 and a radio frequency identification (RFID) reader 228 (e.g., a near-field communication (NFC) reader). Other input devices of the device 104 may include one or more buttons, keypads, touch-sensitive display screens, or the like for receiving input from an operator. Other output devices may include one or more speakers, vibrators, or the like for providing output or feedback to an operator.

Figure 3:
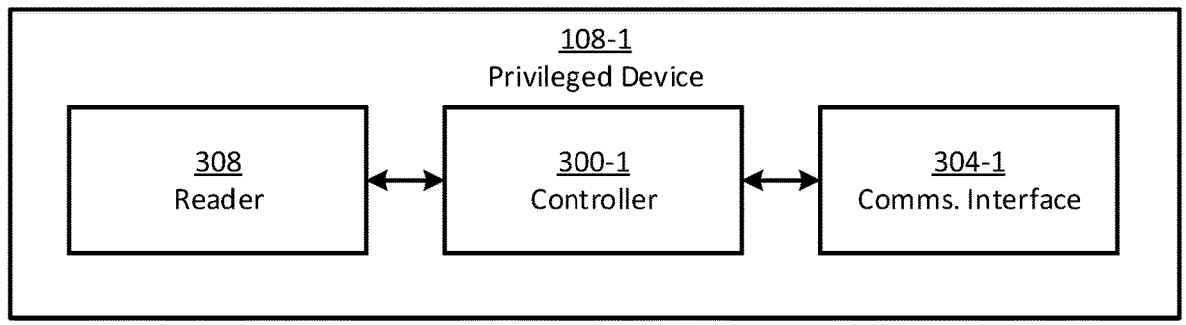
FIG. 3 is a block diagram of certain internal hardware components of the privileged devices of FIG. 1.
Figure 3:
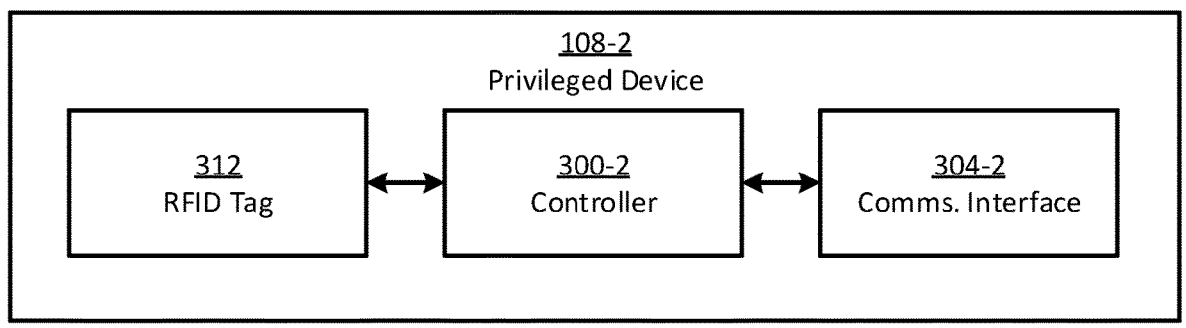

Turning to FIG. 3, certain internal components of the privileged devices 108-1 and 108-2 are illustrated.

The privileged device 108-1 includes a controller 300-1, such as a micro-controller, a micro-processor, one or more cooperating computer processing units (CPUs), or other suitable device capable of executing computer-readable instructions. The controller 300 may comprise one or more integrated circuits and may include and/or be interconnected with a non-transitory computer-readable storage medium storing computer-readable instructions which when executed configure the controller 300 and/or the privileged device 108-1 to perform the functionality described herein.

The privileged device 108-1 further includes a communications interface 304-1 enabling the privileged device 108-1 to exchange data with other computing devices such as the host device 104. The communications interface 304-1 is interconnected with the controller 300-1 and includes suitable hardware (e.g., transmitters, receivers, network interface controllers and the like) to communicate with other computing devices. The specific components of the communications interface 304-1 are selected based on the type of network or other links that the privileged device 108-1 is to communicate over. For example, the communications interface 304-1 may enable Bluetooth or other short-range wireless communications protocols to pair with the host device 104.

The privileged device 108-1 also includes a reader 308 capable of reading optical representations of data, such as a linear barcode, a two-dimensional barcode, or the like. The reader 308 may include a laser and a sensor, an image sensor or camera-based barcode reader, or other suitable components to capture and read barcodes or other optical representations of data. The reader 308 may be interconnected with the controller 300 for control and processing.

The privileged device 108-2 similarly includes a controller 300-2, similar to the controller 300-1, and a communications interface 304-2 similar to the communications interface 304-2, as well as an RFID tag 312.

The RFID tag 312 may be an NFC tag or the like. The RFID tag 312 encodes pairing parameters for the privileged device 108-2 to allow other devices to initiate pairing requests to the privileged device 108-2. The pairing parameters may include a media access control (MAC) address of the privileged device 108-2, any security and/or shared link keys used to enable the pairing, and the like.

Additionally, the RFID tag 312 encodes an approval code for the privileged device 108-2. The approval code may be static and unique per device. For example, the approval code may be a serial number of the privileged device 108-2, or the like. As will be described further herein, the approval code may be communicated to the host device 104 to enable the privileged device 108-2 to subsequently pair to the host device 104 silently. In some examples, the RFID tag 312 may be separate from the privileged device 108-2 (i.e., not integrated with the privileged device 108-2), but otherwise associated with the privileged device 108-2 to associate the approval code with the privileged device 108-2.

Figure 4:
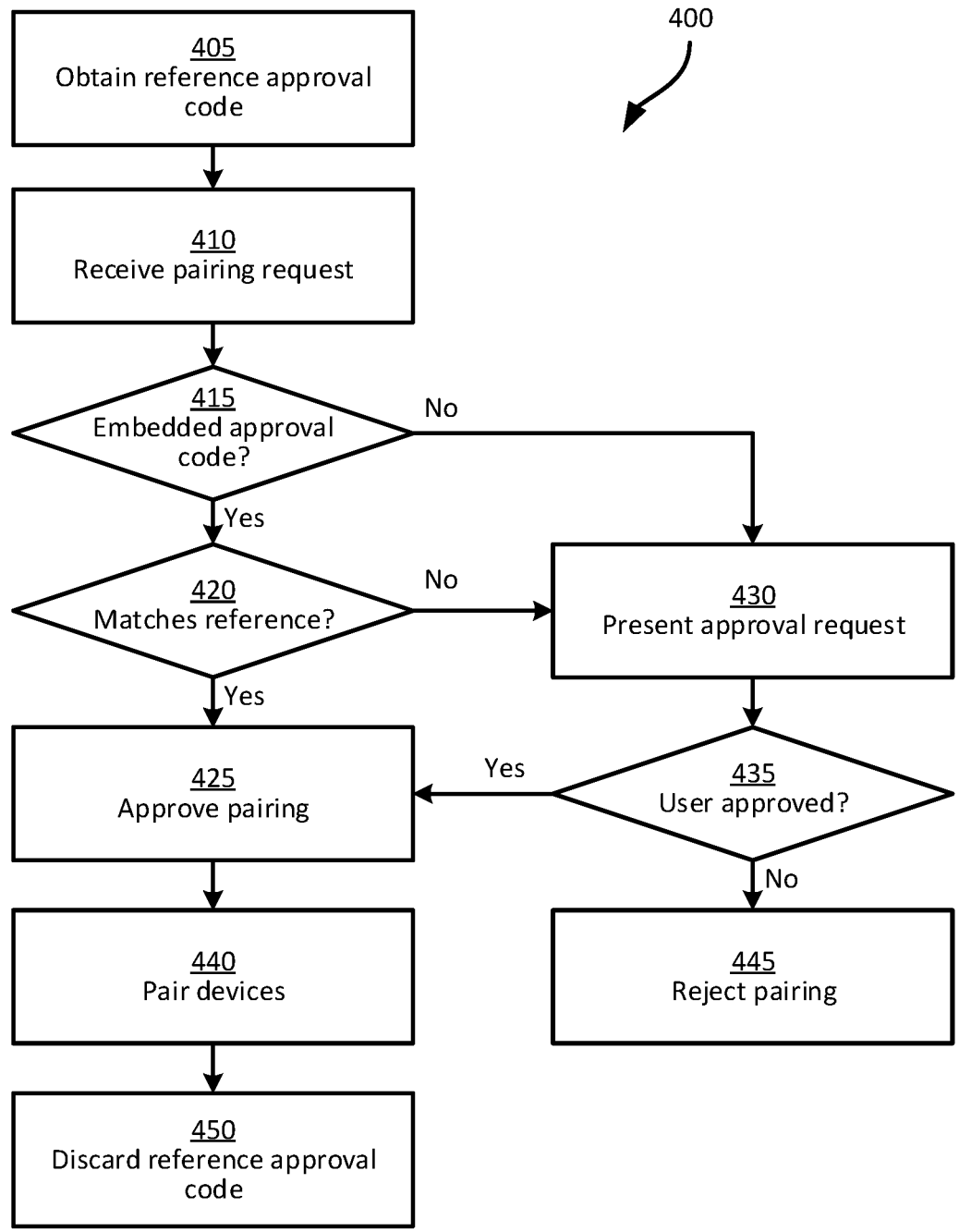
FIG. 4 is a flowchart of a method of pairing devices in the system of FIG. 1.

Turning now to FIG. 4, the functionality implemented by the device 104 will be discussed in greater detail. FIG. 4 illustrates a method 400 of silent pairing. The method 400 will be discussed in conjunction with its performance in the system 100, and particularly by the device 104, via execution of the application 208 by the processor 200. In some examples, some or all of the method 400 may be performed by the controller 220. In particular, the method 400 will be described with reference to the components of FIGS. 1, 2, and 3. In other examples, the method 400 may be performed by other suitable devices or systems.

At block 405, the host device 104 obtains a reference approval code to use as a reference for incoming pairing requests to enable the host device 104 to automatically approve the pairing and allow the pairing to occur silently. That is, the reference approval code provides an additional point of reference to facilitate the silent pairing but is supplementary to the pairing parameters used to enable the pairing. The reference approval code may be transmitted alongside the pairing request or embedded in the pairing request, for example by repurposing a field which is typically transmitted as part of a pairing request but is not used to enable the pairing. For example, the reference approval code may be the value of a class of device identifier.

In addition, at block 405, the host device 104 may provide its pairing parameters to allow one of the client devices 108, 112 to initiate a pairing request to the host device 104 based on the pairing parameters. The pairing parameters may include the MAC address of the host device 104, any security and/or shared link keys used to enable the pairing, and the like.

The host device 104 may obtain the reference approval code and provide its pairing parameters differently, for example, based on the type of pairing the client device 108 is enabled for.

Figure 5:
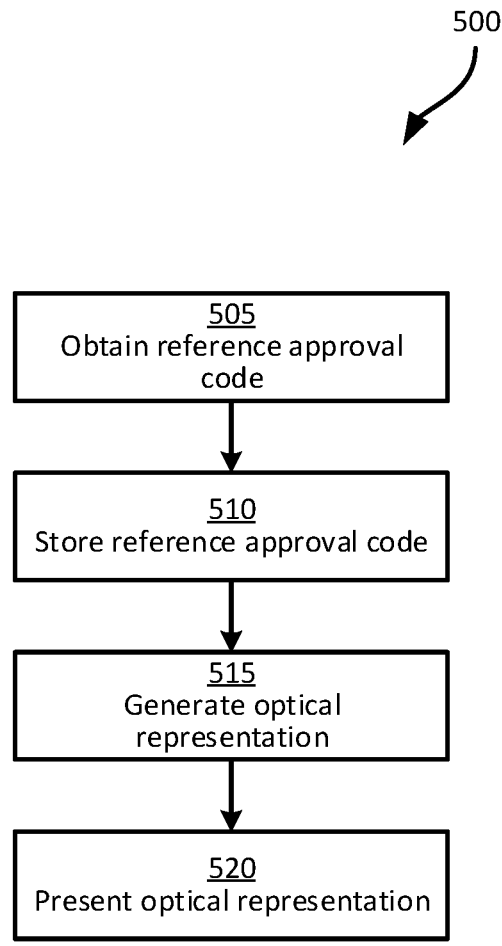
FIG. 5 is a flowchart of a method of obtaining a reference approval code at block 405 of the method of FIG. 4.

For example, referring to FIG. 5, an example method 500 of obtaining a reference approval code and providing pairing parameters by the host device 104 is depicted. In particular, the method 500 may be employed when the client device is enabled to read an optical representation (i.e., a barcode). For example, the method 500 may be employed to pair the privileged device 108-1 with the host device 104.

At block 505, the host device 104 generates the reference approval code. In particular, when reusing an existing field of the pairing request such as the class of device identifier, such a field may be easily spoofed by another device, such as the access-controlled device 112, for which access control is desired. Accordingly, rather than using the class of device identifier associated with the privileged device 108-1, the host device 104 may generate a reference approval code to be used in place of the class of device identifier in the pairing request to allow for silent pairing. Additionally, by generating the reference approval code, the reference approval code may be unique per performance of the method 500. For example, the reference approval code may be generated using a random number generator, pseudo-randomly based on the current date and/or time, or the like. In some examples, after generating the reference approval code, the host device 104 may additionally encrypt the reference approval code for additional security.

At block 510, the host device 104 stores the reference approval code. For example, the reference approval code may be stored in the repository 212 or may be sent to and stored at the controller 220 of the communications interface 216. To maintain security, the encrypted version of the reference approval code may be stored.

At block 515, the host device 104 generates an optical representation encoding the reference approval code. The optical representation may additionally encode the pairing parameters (i.e., the MAC address and any additional relevant parameters) of the host device 104. For example, the optical representation may be a linear barcode, a two-dimensional barcode (i.e., a QR code), or the like.

At block 520, the host device 104 presents the optical representation at the display 224 to allow a client device, such as the privileged device 108-1, to provide the reference approval code and its pairing parameters to the privileged device 108-1 for use in a subsequent pairing request.

Figure 6:
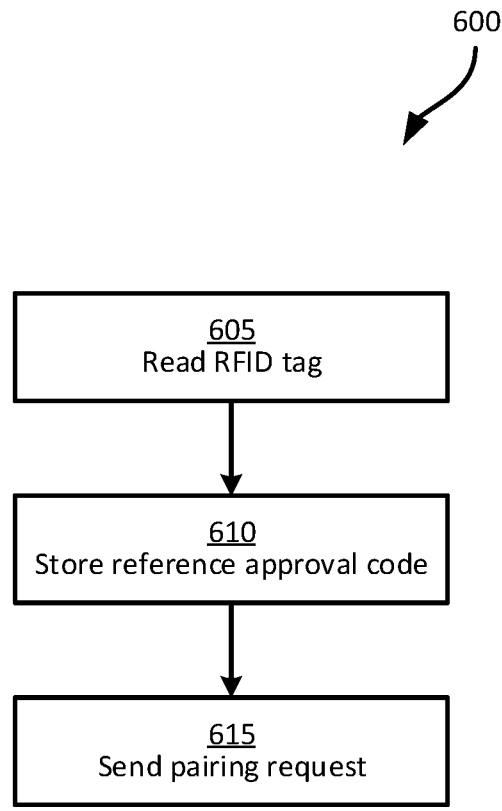
FIG. 6 is a flowchart of another method of obtaining a reference approval code at block 405 of the method of FIG. 4.

Turning now to FIG. 6, another example method 600 of obtaining a reference approval code at block 405 of the method 400 is depicted. In particular, the method 600 may be employed when the client device has an NFC or other RFID tag to facilitate pairing. For example, the method 600 may be employed to pair the privileged device 108-2 with the host device 104, and is described in conjunction with said pairing, however in other examples, the method 600 may be employed to pair to other suitable devices.

At block 605, the host device 104, and in particular the reader 228, reads the tag 312 of the privileged device. In particular, the host device 104 may extract from the tag 312, the MAC address and the approval code of the privileged device 108-2. The host device 104 may additionally decrypt the MAC address and/or the approval code of the privileged device 108-2.

At block 610, the host device 104 stores the approval code for the privileged device 108-2 as the reference approval code for a subsequent pairing with the privileged device 108-2. For example, the reference approval code may be stored in the repository 212 or may be sent to and stored at the controller 220 of the communications interface 216. To maintain security, an encrypted version of the reference approval code may be stored.

At block 615, the host device 104 sends a pairing request to the privileged device 108-2 using the MAC address and any other relevant pairing parameters extracted from the tag 312. That is, the host device 104 may broadcast a pairing request to the MAC address extracted at block 605. Additionally, the pairing request may further include the MAC address and other relevant pairing parameters for the host device 104. Thus, the host device 104 may provide its pairing parameters to the privileged device 108-2 for use in a subsequent pairing request.

Returning to FIG. 4, at block 410, the host device 104 receives a pairing request from a client device, such as one of the client devices 108, 112. The pairing request may include pairing parameters for the requesting device to provide the host device 104 with sufficient information to complete the pairing to the requesting device.

Figure 7:
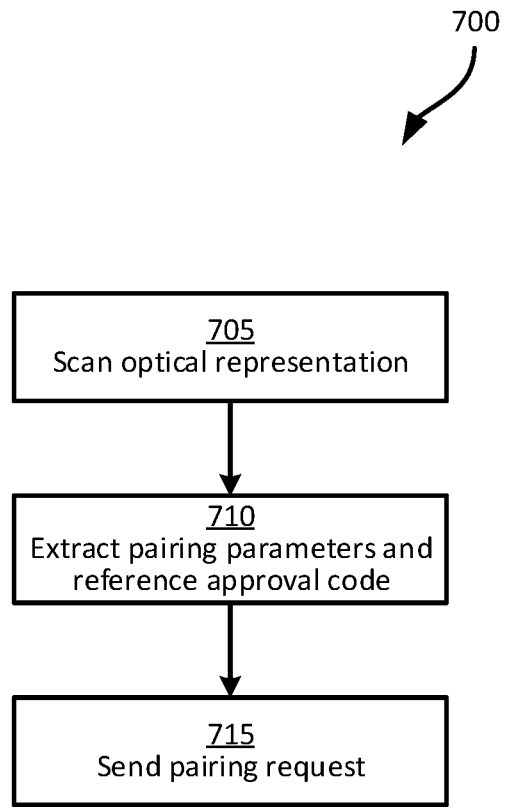
FIG. 7 is a flowchart of a method of generating a pairing request by a privileged device at block 410 of the method of FIG. 4.

For example, referring to FIG. 7, an example method 700 of sending a pairing request for privileged access at a privileged device is depicted. In particular, the method 700 may be employed when the client device is enabled to read an optical representation after performance of the method 400, such as the privileged device 108-1. The method 700 will be described in conjunction with the privileged device 108-1; in other examples, the method 700 may be performed by other suitable devices.

At block 705, the privileged device 108-1, and in particular, the reader 308 scans the optical representation presented by the host device 104. The optical representation provides the privileged device 108-1 with the pairing parameters of the host device 104 to enable the privileged device 108-1 to subsequently make a pairing request with an embedded approval code for privileged access to the host device 104. Further, the optical representation provides the privileged device with the appropriate approval code to use as the embedded approval code.

Accordingly, at block 710, the privileged device 108-1 extracts, from the optical representation, the pairing parameters of the host device 104 and the reference approval code generated by the host device 104. In some examples, the privileged device 108-1 may additionally decrypt the reference approval code.

At block 715, the privileged device 108-1 sends a pairing request to the host device 104 using the MAC address and any other relevant pairing parameters extracted from the optical representation at block 710. That is, the privileged device 108-1 may broadcast a pairing request to the MAC address of the host device 104. The pairing request includes pairing parameters for the privileged device 108-1, such as the MAC address of the privileged device 108-1, any security and/or link keys, and the like to enable the host device 104 to complete the pairing to the privileged device 108-1. Additionally, to identify the privileged device 108-1 as having privileged access to enable silent pairing, the privileged device 108-1 includes the reference approval code extracted at block 710 as an embedded approval code in the pairing request. For example, the privileged device 108-1 may use the reference approval code in place of the class of device identifier, or the privileged device 108-1 may append the reference approval code as an additional field embedded in the pairing request.

Figure 8:
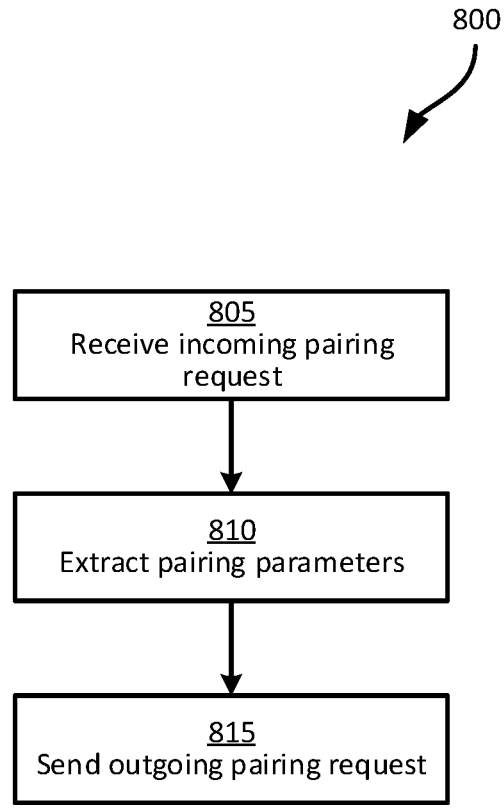
FIG. 8 is a flowchart of another method of generating a pairing request by a privileged device at block 410 of the method of FIG. 4.

FIG. 8 depicts another example method of sending a pairing request for privileged access at a privileged device. In particular, the method 800 may be employed when the client device includes an RFID tag, such as the privileged device 108-2. Accordingly, the method 800 will be described in conjunction with the privileged device 108-2; in other examples, the method 800 may be performed by other suitable devices.

At block 805, the privileged device 108-2 receives an incoming pairing request from the host device 104. For example, the method 800 may be initiated in response to receiving the pairing request from the host device 104 after completion of the method 600. In particular, the incoming pairing request from the host device 104 provides the privileged device 108-2 with the pairing parameters of the host device 104 to enable the privileged device 108-2 to subsequently make an outgoing pairing request with an embedded approval code for privileged access to the host device 104.

At block 810, the privileged device 108-2 extracts, from the incoming pairing request, the pairing parameters of the host device 104. To do so, the privileged device 108-2 may accept the incoming pairing request and complete the pairing process. Once the privileged device 108-2 has extracted the relevant pairing parameters of the host device 104, the privileged device 108-2 may break the pairing to the host device 104 prior to proceeding to block 815.

At block 815, the privileged device 108-2 sends an outgoing pairing request to the host device 104 using the MAC address and any other relevant pairing parameters extracted from the incoming pairing request at block 810. That is, the privileged device 108-2 may broadcast an outgoing pairing request to the MAC address of the host device 104. The outgoing pairing request includes pairing parameters for the privileged device 108-2, such as the MAC address of the privileged device 108-2, any security and/or link keys, and the like to enable the host device 104 to complete the pairing to the privileged device 108-2. Additionally, to identify the privileged device 108-2 as having privileged access to enable silent pairing, the privileged device 108-2 is further configured to include the approval code specified in its RFID tag 312 as an embedded approval code in the pairing request. For example, the privileged device 108-2 may use the reference approval code in place of the class of device identifier, or the privileged device 108-2 may append the reference approval code as an additional field embedded in the pairing request.

Returning to FIG. 4, at block 415, after receiving a pairing request from a requesting client device, the host device 104 checks for an embedded approval code in the pairing request. For example, the host device 104 may check if a class of device identifier is specified in the pairing request. In some examples, the host device 104 may check for a specific format of the class of device identifier to determine whether the class of device identifier is a standard class of device identifier, or whether it conforms to a specific expected format of an approval code. In other examples, the host device 104 is configured to check for an additional field supplementary to the pairing request specifying the approval code.

For example, pairing requests such as those generated after performances of either of the methods 700 or 800 by the privileged client devices 108-1 and 108-2, respectively, include an embedded approval code. Accordingly, an affirmative determination at block 415 may be indicative that the requesting device is has privileged access, such as the privileged devices 108. Similarly, the lack of an embedded approval code in the pairing request is indicative that the pairing request originated from an access-controlled device, such as the access-controlled device 112.

Accordingly, if the determination at block 415 is affirmative, that is, the pairing request includes an embedded approval code, the host device 104 proceeds to block 420. If, the determination at block 415 is negative, that is, the pairing request does not include an embedded approval code, the host device 104 proceeds to block 430.

At block 420, the host device 104 compares the embedded approval code with the reference approval code obtained at block 405. The host device 104 may decrypt the embedded approval code and/or the reference approval code as appropriate to make the comparison.

If the embedded approval code and the reference approval code match, the host device 104 may determine that the requesting device has privileged access and may proceed through the remainder of the pairing process silently. For example, after performance of the methods 500 and 700, a pairing request from the privileged device 108-1 will include an embedded approval code which was extracted from the optical representation encoding the reference approval code generated and stored by the host device 104. Accordingly, barring another performance of the method 500 in which the reference approval code stored by the host device 104 is overwritten, the embedded approval code in the pairing request from the privileged device 108-1 and the reference approval code should match. Additionally, the embedded approval code will be difficult to fake or spoof, since the corresponding reference approval code is generated for each execution of the method 500, thereby providing additional assurance that the privileged device 108-1 has privileged access.

Similarly, after performance of the methods 600 and 800, a pairing request from the privileged device 108-2 will include an embedded approval code which was encoded in the RFID tag 312 and which was extracted and stored as the reference approval code by the host device 104. Accordingly, the embedded approval code in the pairing request from the privileged device 108-2 and the reference approval code should match. Additionally, the embedded approval code will be difficult to fake or spoof by an access-controlled device, since the approval code is unique per device and may be encrypted for additional security.

Accordingly, if the determination at block 420 is affirmative, that is, the embedded approval code matches the reference approval code, the host device 104 bypasses the requirement for an approval request by a user and proceeds directly to block 425.

In some examples, in addition to checking whether the embedded approval code and the reference approval code match, the host device 104 may also check whether the application 208 is in focus at the host device 104, particularly when the host device 104 is presenting an optical representation for the pairing parameters. If the application 208 is not in focus, the host device 104 may make a negative determination at block 420. In other examples, in addition to checking whether the embedded approval code and the reference approval code match, the host device 104 may also check whether the pairing request was received within a threshold time of sending an outgoing pairing request, for example after performance of the method 800. If the pairing request was not received within the threshold time, the host device 104 may make a negative determination at block 420. Other additional checks and verifications are also contemplated.

If, at block 420, the embedded approval code does not match the reference approval code, the host device 104 determines that the requesting device is an access-controlled device, and hence requires additional confirmation from a user prior to completing the pairing process. For example, the access-controlled device 112 may not use the reference approval code provided in the optical representation or may not provide an approval code in an RFID tag to be used as the reference approval code. Accordingly, the embedded approval code in the pairing request by the access-controlled device 112, if one exists, may not be expected to match the reference approval code stored by the host device 104. Hence, the host device 104 may identify the access-controlled device 112 as having restricted or controlled access requiring user confirmation to pair.

Accordingly, if the determination at block 420 is negative, that is, the reference approval code and the embedded approval code do not match, the host device 104 proceeds to block 430.

At block 430, having determined that the pairing request received at block 410 is not entitled to privileged access, either because the pairing request did not include an embedded approval code or because the embedded approval code did not match the reference approval code, the host device 104 generates an approval request and presents the approval request on the display 224 for user input. For example, the approval request may be a pop-up dialogue box asking the user to confirm or deny the pairing request received at block 410.

At block 435, the host device 104 receives user input in response to the approval request and determines whether the pairing request is approved. If, at block 435, the determination is affirmative, that is, the user provided affirmative input confirming the pairing request, then the host device 104 proceeds to block 425.

At block 425, having received an indication that the pairing to the requesting client device should be approved, the host device 104 approves the pairing. The approval indicator may be the matching embedded approval code and reference approval code or the affirmative input from a user of the host device 104. Hence, even if the embedded approval code and the reference approval code do not match, as is the case with the access-controlled device 112, the pairing of the host device 104 and the access-controlled device 112 may still be approved via affirmative input in response to an approval request. In particular, such a pairing is simply access-controlled by the user and does not occur silently, as is the case with the privileged devices 108.

At block 440, in response to approving the pairing, the host device 104 proceeds to pair to the requesting client device based on the pairing request. That is, the host device 104 may use the pairing parameters received in the pairing request to complete any handshakes, secret sharing, or the like to establish a bond with the requesting device.

After completing the pairing to the client device, the host device 104 may store device information for the client device as a most recent paired device. In particular, the host device 104 may store only a most recently paired device, and hence may overwrite said field after pairing to a new device. The device information may include, for example, the MAC address of the client device, or the like.

If, at block 435, the determination is negative, that is, no affirmative input was received from the user, then the host device 104 proceeds to block 445. For example, the lack of affirmative input may be a negative input received from the user. In other examples, after presenting the approval request at the display 224, the host device 104 may initiate a timer (e.g., 30 seconds, one minute, two minutes, etc.) during which an input expected from the user. If the timer expires without receiving input from the user, the host device 104 may make a negative determination at block 435.

At block 445, the host device 104 rejects the pairing to the requesting device. The host device 104 may generate a notification or alert for display on the display 224 or other output to indicate that the pairing was aborted. In some examples, after rejecting or aborting the pairing, the method 400 may return to block 405 or 410 to retry the pairing (e.g., if the user did not approve the pairing within the timer limit, but still wants to pair the devices). In other examples, the host device 104 may proceed to block 450.

At block 450, after pairing is complete (or rejected), the host device 104 may discard the reference approval code. In some examples, block 450 may be triggered when the pairing application is closed. That is, the host device 104 may not immediately discard the reference approval code in response to a successful pairing. Thus, if for example, after pairing, a user realizes that the client device is low on batteries and disconnects the device in order to change the batteries, the same reference approval code may be used to pair the devices again. However, by discarding the reference approval code, the host device 104 can better ensure that the reference approval code is not being copied and spoofed by a device for which access should be controlled.

Figure 9:
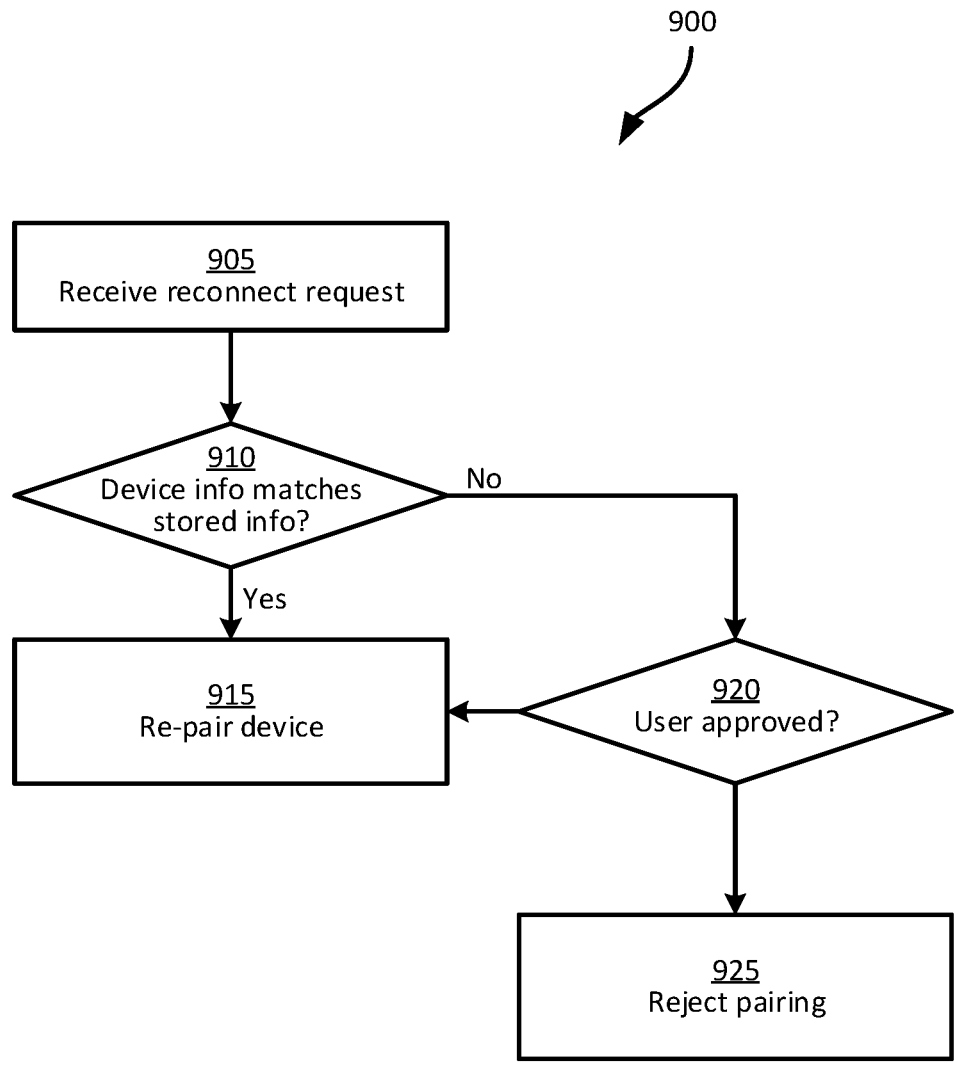
FIG. 9 is a flowchart of a method of silently reconnecting in the system of FIG. 1.

FIG. 9 depicts an example method 900 of reconnecting a client device to the host device 104. The method 900 may be employed when a user of the client device uses a reconnect function (e.g., by pressing a reconnect button or the like) rather than initiating a new pairing to the host device 104.

At block 905, the host device 104 receives a reconnect request from the client device. The reconnect request may include embedded device information (e.g., MAC address or the like) of the client device.

At block 910, the host device 104 compares the embedded device information from the reconnect request to the stored device information of the most recent paired device. If the embedded device information matches the stored device information, that is, the device requesting reconnection is the same device that was most recently paired to the host device 104, then the host device 104 proceeds to block 915.

At block 915, the host device 104 approves the pairing and re-pairs the requesting device. That is, when the approval and re-pairing is based on matching embedded device information from the reconnect request with stored device information from the most recent paired device field, the reconnecting device may be granted privileged access for the purposes of reconnecting, and enables the reconnection to happen silently (i.e., without requesting user confirmation).

If, at block 910, the embedded device information does not match the stored device information, the host device 104 proceeds to block 920. At block 920, the host device 104 generates an approval request and presents the approval request on the display 224 for user input. The approval request may be a pop-up dialog box asking the user to confirm or deny the reconnect request. If the user provides affirmative input confirming the reconnect request, then the host device 104 proceeds to block 915 to re-pair the requesting device.

If, at block 920, no affirmative input was received from the user (e.g., by negative input, or by a time out on the approval request), then the host device proceeds to block 925. At block 925, the host device 104 rejects the reconnection to the requesting device. The host device 104 may generate a notification or alert for display on the display 224 or other output to indicate that the reconnection was aborted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of pairing a client device to a host device, the method comprising:
    obtaining, at the host device, a reference approval code;
    receiving, at the host device, a pairing request from the client device;
    when the pairing requests includes an embedded approval code, comparing the embedded approval code to the reference approval code;
    when the embedded approval code matches the reference approval code, bypassing an approval request and approving a pairing of the client device to the host device;
    responsive to approving the pairing, pairing the client device to the host device based on the pairing request;
    when the embedded approval code does not match the reference approval code, generating and presenting an approval request for a user; and
    responsive to an affirmative input from the user, approving the pairing of the client device to the host device.

2. The method of claim 1, further comprising:
    when the pairing request does not include the embedded approval code, generating and presenting the approval request for a user; and
    responsive to an affirmative input from the user, approving the pairing of the client device to the host device.

3. The method of claim 1, further comprising providing pairing parameters to the client device for the pairing request.

4. The method of claim 1, wherein obtaining the reference approval code comprises generating the reference approval code.

5. The method of claim 4, further comprising:
    generating an optical representation of (i) pairing parameters for the host device and (ii) the reference approval code; and
    presenting the optical representation.

6. The method of claim 4, further comprising generating the reference approval code pseudo-randomly.

7. The method of claim 4, further comprising encrypting the reference approval code.

8. The method of claim 1, further comprising, after pairing the client device to the host device, discarding the reference approval code.

9. The method of claim 1, further comprising:
    after pairing the client device to the host device, storing device information for the client device as a most recent paired device;
    receiving, at the host device, a reconnect request from the client device;
    when embedded device information from the reconnect request matches the device information in the most recent paired device, approving the pairing between the client device and the host device; and
    in response to approving the pairing, re-pairing the client device and the host device.

10. A computing device comprising:
    a communications interface configured to pair to a client device;
    a memory;
    a processor interconnected with the memory and the communications interface, the processor configured to:
    obtain a reference approval code;
    receive a pairing request from the client device;
    when the pairing requests includes an embedded approval code, compare the embedded approval code to the reference approval code;
    when the embedded approval code matches the reference approval code, bypass an approval request and approve a pairing of the client device to the computing device;
    responsive to approving the pairing, control the communications interface to pair the client device to the computing device based on the pairing request;
    when the embedded approval code does not match the reference approval code, generate and present an approval request for a user; and
    responsive to an affirmative input from the user, approve the pairing of the client device to the computing device.

11. The computing device of claim 10, wherein the processor is further configured to:
    when the pairing request does not include the embedded approval code, generate and present the approval request for a user; and
    responsive to an affirmative input from the user, approve the pairing of the client device to the computing device.

12. The computing device of claim 10, wherein the processor is further configured to provide pairing parameters to the client device for the pairing request.

13. The computing device of claim 10, wherein, to obtain the reference approval code, the processor is configured to generate the reference approval code.

14. The computing device of claim 13, wherein the processor is further configured to:
    generate an optical representation of (i) pairing parameters for the computing device and (ii) the reference approval code; and
    present the optical representation.

15. The computing device of claim 13, wherein the processor is configured to generate the reference approval code pseudo-randomly.

16. The computing device of claim 13, wherein the processor is further configured to encrypt the reference approval code.

17. The computing device of claim 10, wherein the processor is further configured to, after pairing the client device to the computing device, discard the reference approval code.

18. The computing device of claim 10, wherein the processor is further configured to:

after pairing the client device to the computing device, store device information for the client device as a most recent paired device;

receive a reconnect request from the client device;

when embedded device information from the reconnect request matches the device information in the most recent paired device, approve the pairing between the client device and the computing device; and in response to approving the pairing, control the communications interface to re-pair the client device and the computing device.

19. A method of pairing a client device to a host device, the method comprising:

obtaining, at the host device, a reference approval code;

receiving, at the host device, a pairing request from the client device;

when the pairing requests includes an embedded approval code, comparing the embedded approval code to the reference approval code;

when the embedded approval code matches the reference approval code, bypassing an approval request and approving a pairing of the client device to the host device;

responsive to approving the pairing, pairing the client device to the host device based on the pairing request;

after pairing the client device to the host device, storing device information for the client device as a most recent paired device;

receiving, at the host device, a reconnect request from the client device;

when embedded device information from the reconnect request matches the device information in the most recent paired device, approving the pairing between the client device and the host device; and in response to approving the pairing, re-pairing the client device and the host device.

* * * * *